US009888491B2

(12) United States Patent
Qiang et al.

(10) Patent No.: US 9,888,491 B2
(45) Date of Patent: Feb. 6, 2018

(54) METHOD AND APPARATUS FOR PERFORMING DOWNLINK MU-MIMO TRANSMISSION

(71) Applicant: Telefonaktiebolaget L M Ericsson (publ), Stockholm (SE)

(72) Inventors: Yongquan Qiang, Beijing (CN); Ping Wu, Beijing (CN); Feng Li, Beijing (CN); Jiying Xu, Beijing (CN); Lei Xiao, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 57 days.

(21) Appl. No.: 14/909,868

(22) PCT Filed: Aug. 22, 2013

(86) PCT No.: PCT/CN2013/082045
§ 371 (c)(1),
(2) Date: Feb. 3, 2016

(87) PCT Pub. No.: WO2015/024227
PCT Pub. Date: Feb. 26, 2015

(65) Prior Publication Data
US 2016/0183289 A1 Jun. 23, 2016

(51) Int. Cl.
*H04W 72/12* (2009.01)
*H04B 7/0452* (2017.01)
(Continued)

(52) U.S. Cl.
CPC ...... *H04W 72/1278* (2013.01); *H04B 7/0452* (2013.01); *H04B 7/0456* (2013.01);
(Continued)

(58) Field of Classification Search
None
See application file for complete search history.

(56) References Cited

U.S. PATENT DOCUMENTS

2010/0285810 A1 11/2010 Ko et al.
2010/0303034 A1 12/2010 Chen et al.
(Continued)

FOREIGN PATENT DOCUMENTS

CN 101854668 A 10/2010
CN 102740480 A 10/2012

OTHER PUBLICATIONS

Author Unknown, "Technical Specification Group Radio Access Network; Evolved Universal Terrestrial Radio Access (E-UTRA); Physical Channels and Modulation (Release 9)," Technical Specification 36.211, Version 9.1.0, 3GPP Organizational Partners, Mar. 2010, 85 pages.
(Continued)

*Primary Examiner* — Diane Lo
(74) *Attorney, Agent, or Firm* — Withrow & Terranova, PLLC

(57) ABSTRACT

The embodiments disclose a method and apparatus for performing DL MU-MIMO transmission in a radio communication network enabling MU-MIMO. The method comprises: pairing a UE with one or more other UEs for DL MU-MIMO transmission in the radio communication network; scheduling through a control channel at least one real layer and at least one virtual layer to the UE, wherein each of the at least one virtual layer is a real layer scheduled for at least one of the one or more other UEs; and performing DL transmission to the UE and the one or more other UEs on a transport channel, wherein only the at least one real layer is used for DL transmission to the UE, and each of the at least one virtual layer is used for DL transmission to at least one of the one or more other UEs.

16 Claims, 5 Drawing Sheets

(51) Int. Cl.
- *H04B 7/04* (2017.01)
- *H04L 1/18* (2006.01)
- *H04L 5/14* (2006.01)
- *H04L 1/16* (2006.01)
- *H04L 25/03* (2006.01)
- *H04J 11/00* (2006.01)
- *H04L 25/02* (2006.01)
- *H04B 7/0456* (2017.01)

(52) U.S. Cl.
CPC ........ *H04J 11/0036* (2013.01); *H04L 1/1607* (2013.01); *H04L 1/1861* (2013.01); *H04L 5/14* (2013.01); *H04L 25/03898* (2013.01); *H04W 72/1273* (2013.01); *H04L 25/0228* (2013.01)

(56) References Cited

U.S. PATENT DOCUMENTS

| | | |
|---|---|---|
| 2010/0309861 A1 | 12/2010 | Gorokhov et al. |
| 2010/0322176 A1* | 12/2010 | Chen ............... H04B 7/024 370/329 |
| 2011/0032839 A1* | 2/2011 | Chen ............... H04B 7/024 370/252 |
| 2011/0176629 A1* | 7/2011 | Bayesteh ............ H04B 7/0417 375/267 |
| 2012/0026964 A1 | 2/2012 | Koivisto et al. |
| 2013/0039332 A1 | 2/2013 | Nazar et al. |
| 2013/0163546 A1 | 6/2013 | Frederiksen et al. |

OTHER PUBLICATIONS

International Search Report and Written Opinion for International Patent Application No. PCT/CN2013/082045, dated May 23, 2014, 11 pages.

Ericsson et al., "R4-131647: Framework for NAICS SI," 3rd Generation Partnership Project (3GPP), TSG-RAN WG4 Meeting #66bis, Apr. 15-19, 2013, 4 pages, Chicago, Illinois.

Orange, "R1-131633: Views on network-assisted interference cancellation and suppression," 3rd Generation Partnership Project (3GPP), TSG-RAN WG1 #72bis, Apr. 15-19, 2013, 9 pages, Chicago, USA.

Supplementary Search Report for European Patent Application No. 13891675, dated Mar. 9, 2017, 11 pages.

International Preliminary Report on Patentability for International Patent Application No. PCT/CN2013/082045, dated Mar. 3, 2016, 5 pages.

* cited by examiner

METHOD AND APPARATUS FOR PERFORMING DOWNLINK MU-MIMO TRANSMISSION

This application is a 35 U.S.C. §371 national phase filing of International Application No. PCT/CN2013/082045, filed Aug. 22, 2013, the disclosure of which is incorporated herein by reference in its entirety.

TECHNICAL FIELD

The present technology relates to the field of radio communication, particularly to a method of performing downlink (DL) multi-user multiple-input multiple-output (MU-MIMO) transmission. The technology also relates to an apparatus and a computer readable storage medium for performing the method.

BACKGROUND

In a system enabling MIMO techniques like long-term evolution (LTE) system, MIMO techniques contribute to improve frequency efficiency and network capacity in the 3rd Generation Partnership Project (3GPP). For instance, in transmission mode (TM) 3, TM4 and TM8 of Rel-9, two layer transmissions are scheduled for a single user as single user MIMO (SU-MIMO). Alternatively, two or more user equipments (UEs) can be paired together to share the same time-frequency resources as MU-MIMO. MU-MIMO exploits further the spatial separation and diversity, and higher frequency efficiency than SU-MIMO is expected, which however may not be the case in practice.

Due to the limitation of UE's antenna and processing capability, a typical scenario of MU-MIMO is to schedule each of paired UEs with partial layers. The remained layers are disabled as dummy for other paired UEs. Taking single-layer DL MU-MIMO as example, there are two layers available for two UEs. Usually, only one layer is scheduled for each of paired UEs as shown in FIG. 1.

In conventional MU-MIMO, since the paired UEs are not well separated from each other, each UE suffers strong inter-layer interference from other paired UEs. Usually, opposing to SU-MIMO where joint detection (e.g. minimum mean square estimation (MMSE) or interference rejection combining (IRC) receiver) is used, the interference from a paired UE in MU-MIMO is simply taken as noise without doing joint detection (JD) as done in SU-MIMO, which results in throughput degradation as observed in field test.

In order to improve the MU-MIMO performance, several solutions have been proposed as below:

1) Pair UEs that have Good Spatial Separation

The problem is that spatial separation in DL is difficult to be estimated by eNodeB (eNB). And the pairing rate will be degraded in order to obtain good multiple-user separation. So the performance gain is limited by existing interference and low pairing rate.

2) Design Null Beamforming Weight

The weights for paired UEs can be designed carefully to null the interference. However, the weights are calculated based on the uplink (UL) channel estimation. Due to the channel estimation inaccuracy and non-ideal channel reciprocity, it's difficult to separate well such DL inter-layer interference by eNB.

On the other hand, when null beamforming weight is used, the power of desired signal is degraded compared with that of maximum ratio combining (MRC) and grid of beam (GOB) weights. Furthermore, the computation complexity for of nulling space processing is another challenge for eNB.

3) Do Blind IRC at UE Side

Some advanced UEs have the capability to do blind IRC to mitigate the unknown interference. However, it can not resolve the inter-layer interference well in DL MU-MIMO, among other reasons, blind IRC is not supported by all UEs in any cases. Receiver algorithm is a UE-specific behavior, which is not mandatory by 3GPP. IRC might not be supported or enabled by all UE vendors in any cases, due to the complicated processing, various scenarios and etc. Thus, it can not assume IRC working well at UE side when doing DL MU-MIMO.

4) Do Blind Detection on Presence of Interfering Layers

As specified in 3GPP and descried in the patent application No. US20100285810, the UE-specific reference signal for port7, port8 and port v+6 is independent on UE-specific radio network temporary identifier (RNTI) and length of Physical Resource Block (PRB) allocated. This allows UE to detect blindly if other layers are being co-scheduled for other UEs, and do channel estimation for MMSE or IRC accordingly. It requires UE to do blind detection on presence of interference on each PRB by searching all possible reference sequences. It introduces extra complexity for UE. Furthermore, this kind of blind detection is not robust enough, with possibility of either false alarm or missing, due to the non-perfect orthogonality of reference sequence. In addition, in common reference signal (CRS) based transmission mode (e.g. TM4), the blind detection on presence of interfering layers is infeasible.

SUMMARY

An aspect of the present disclosure is a method of performing DL MU-MIMO transmission in a base station of a radio communication network enabling MU-MIMO. The method comprises: pairing a UE with one or more other UEs for DL MU-MIMO transmission in the radio communication network; scheduling through a control channel at least one real layer and at least one virtual layer to the UE, wherein each of the at least one virtual layer is a real layer scheduled for at least one of the one or more other UEs; and performing DL transmission to the UE and the one or more other UEs on a transport channel, wherein only the at least one real layer is used for DL transmission to the UE, and each of the at least one virtual layer is used for DL transmission to at least one of the one or more other UEs.

Another aspect of the present disclosure is a base station configured to perform DL MU-MIMO transmission in a radio communication network enabling MU-MIMO. The base station may comprise a pairing unit, a scheduling unit and a performing unit. The pairing unit is adapted to pair a UE with one or more other UEs for DL MU-MIMO transmission in the radio communication network; the scheduling unit is adapted to schedule through a control channel at least one real layer and at least one virtual layer to the UE, wherein each of the at least one virtual layer is a real layer scheduled for at least one of the one or more other UEs; and the performing unit is adapted to perform DL transmission to the UE and the one or more other UEs on a transport channel, wherein only the at least one real layer is used for DL transmission to the UE, and each of the at least one virtual layer is used for DL transmission to at least one of the one or more other UEs.

A further aspect of the present disclosure is a computer readable storage medium storing the instructions which, when running on a base station, cause the base station to perform the steps of the method as described above.

Still a further aspect of the present disclosure is an apparatus for performing DL transmission in a radio communication network enabling MU-MIMO. The apparatus may comprise a processor and a memory. The memory contains instructions executable by the processor whereby the apparatus is operative to pair a UE with one or more other UEs for DL MU-MIMO transmission in the radio communication network; schedule through a control channel at least one real layer and at least one virtual layer to the UE, wherein each of the at least one virtual layer is a real layer scheduled for at least one of the one or more other UEs; and perform DL transmission to the UE and the one or more other UEs on a transport channel, wherein only the at least one real layer is used for DL transmission to the UE, and each of the at least one virtual layer is used for DL transmission to at least one of the one or more other UEs.

As a UE of the paired UEs is scheduled with both the real layer(s) used for DL transmission by itself and the virtual layer(s) actually used for such DL transmission by other paired UEs, the UE is implicitly triggered to perform joint detection among all the scheduled layers including both the real layer(s) and virtual layer(s), and meanwhile may be provided with supplementary information that may be used in the joint detection such as scrambling identity for reference signal, precoding matrix, number of layers, and the like. Thus, the interference from virtual layers (i.e. the inter-layer interference from other paired UEs) can be mitigated or even removed by the UE in a non-blind manner. With the mitigation/removal of the inter-layer interference among the paired UE in the DL MU-MIMO transmission, the performance gain of MU-MIMO over SU-MIMO can be readily obtained by further exploiting the spatial separation and diversity.

BRIEF DESCRIPTION OF THE DRAWINGS

The technology will now be described, by way of example, based on embodiments with reference to the accompanying drawings, wherein.

DETAILED DESCRIPTION

Figure 1:
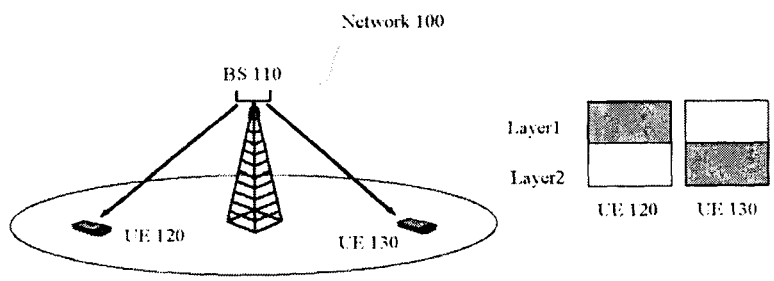
FIG. 1 illustrates a schematic view of a conventional DL MU-MIMO transmission in a radio communication network.

Embodiments herein will be described more fully hereinafter with reference to the accompanying drawings. The embodiments herein may, however, be embodied in many different forms and should not be construed as limiting the scope of the appended claims. The elements of the drawings are not necessarily to scale relative to each other. Like numbers refer to like elements throughout.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealized or overly formal sense unless expressly so defined herein.

The present technology is described below with reference to block diagrams and/or flowchart illustrations of methods, apparatus (systems) and/or computer program according to the present embodiments. It is understood that blocks of the block diagrams and/or flowchart illustrations, and combinations of blocks in the block diagrams and/or flowchart illustrations, may be implemented by computer program instructions. These computer program instructions may be provided to a processor, controller or controlling unit of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Accordingly, the present technology may be embodied in hardware and/or in software (including firmware, resident software, micro-code, etc.). Furthermore, the present technology may take the form of a computer program on a computer-usable or computer-readable storage medium having computer-usable or computer-readable program code embodied in the medium for use by or in connection with an instruction execution system. In the context of this document, a computer-usable or computer-readable storage medium may be any medium that may contain, store, or is adapted to communicate the program for use by or in connection with the instruction execution system, apparatus, or device.

Although specific terms in some specifications are used here, such as base station, it should be understand that the embodiments are not limited to those specific terms but may be applied to all similar entities, such as Access Point (AP), cell, sector, femto base station, Core Network (CN), NodeB, eNodeB etc.

Embodiments herein will be described below with reference to the drawings.

Figure 2:
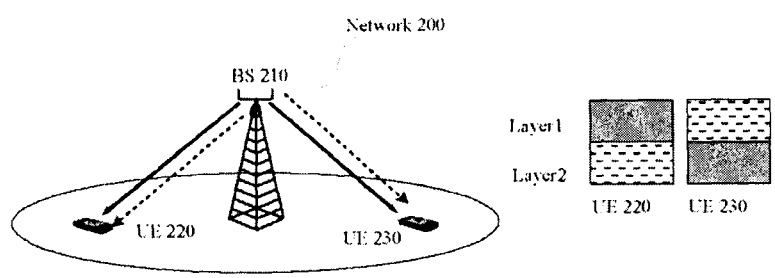
FIG. 2 illustrates a schematic view of a DL MU-MIMO transmission in accordance with an embodiment in a radio communication network.

FIG. 2 illustrates a schematic view of a DL MU-MIMO transmission in accordance with an embodiment in a radio communication network.

As shown in FIG. 2, the network 200 comprises a base station (BS) 210. The BS 210 serves UE 220 and UE 230. Here, the network 200 may refer to any radio communication network enabling the MU-MIMO mechanism, including but not limited to the Time-Division Duplex Long-Term Evolution (TDD-LTE), Frequency-Division Duplex Long-Term Evolution (FDD-LTE), Time Division Synchronous Code Division Multiple Access (TD-SCDMA), Wireless Fidelity (WiFi), Bluetooth, Universal Mobile Telecommunications System (UMTS), Worldwide Interoperability for Microwave Access (WiMAX), and the like. The term "base station" used herein may indicate any type of communication node, such as Access Point (AP), macro base station, femto base station, Core Network (CN), NodeB, eNodeB etc. For simplicity, the embodiments will be described in the context of LTE system. The term "UE" used herein may indicates all forms of devices enabling the user to communicate via a radio communication network, such as, smart phones, cellular phone, Personal Digital Assistant (PDA), and the like.

For simplicity and clarity, only one BS and two UEs are shown in the radio communication network 200. It will be appreciated that one or more BSs may exist in the wireless communication network, and each BS may serve one or more UEs in the mean time.

Figure 3:
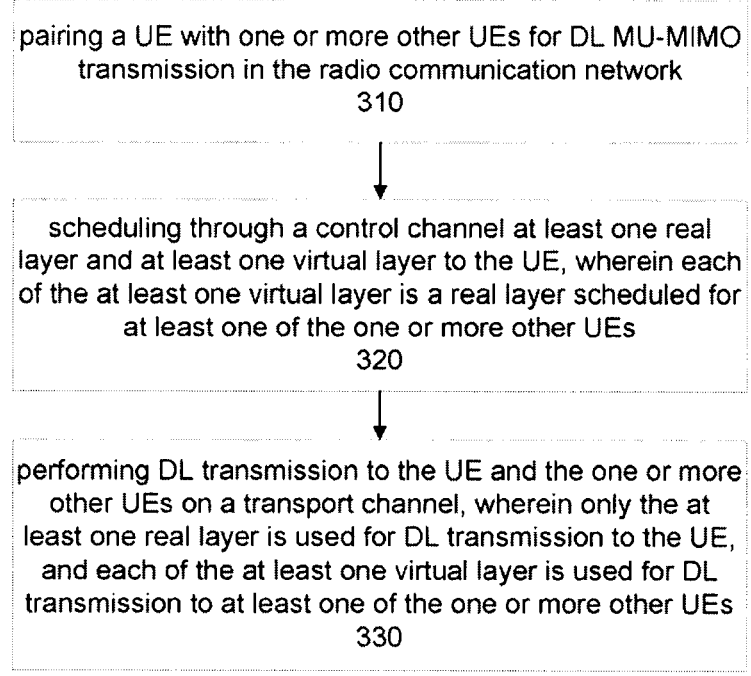
FIG. 3 schematically illustrates a flowchart of performing the DL MU-MIMO transmission in accordance with an embodiment.

Now the process of the embodiment will be described in detail with reference to FIG. 2 and the flowchart as illustrated in FIG. 3, which shows a method of performing DL MU-MIMO transmission in accordance with an embodiment.

In block 310, the BS 210 pairs a UE (e.g. UE 220) with one or more other UEs (e.g. UE 230) for DL MU-MIMO transmission in a radio communication network e.g. network 200. The DL transmission refers to the data transmission from the BS to the UE(s). Herein, the term "paired UEs" will be used to represent two or more UEs sharing the same time-frequency resources, for example at different layers in space, in a DL MU-MIMO transmission. For example, the paired UEs may include UE 220 and UE 230. Here, it should be appreciated that more than one UE can be paired with a UE (e.g. UE 220 or 230) for the DL MU-MIMO transmission.

Specifically, the BS 210 may pair the UEs having a predetermined spatial distance from each other. However, it should be appreciated that the BS 210 may determine which UEs will be paired together for a DL MU-MIMO transmission depending on other known criteria.

In block 320, the BS 210 schedules at least one real layer and at least one virtual layer to the UE (e.g. UE 220) through a control channel, e.g. the Physical Downlink Control Channel (PDCCH), and each of the at least one virtual layer is a real layer scheduled for at least one of the one or more other UEs (e.g. UE 230 in the scenario of FIG. 2). Here, a real layer is defined as a layer that is scheduled through the control channel to a UE and used to perform DL transmission on the transport channel for the UE, while a virtual layer is defined as a layer that is scheduled through the control channel to a UE but without performing DL transmission on transport channel for the UE. Indeed, in this embodiment, the virtual layer is used to perform the DL transmission to other UE(s) whose real layer is such a virtual layer. As indicated, only part of layers scheduled to the UE will undertake the DL transmission to such UE.

For example, the BS 210 may schedule through the PDCCH the layer 1 and the layer 2 to the UE 220. The layer 1 is scheduled as the real layer of the UE 220 and the layer 2 is scheduled as the virtual layer of the UE 220. Meanwhile, the BS 210 schedules the layer 2 to the UE 230. The layer 2 is scheduled as the real layer of the UE 230. Alternatively, the BS 210 may also schedule both the layer 1 and the layer 2 to the UE 230. In this case, the layer 2 still is the real layer of the UE 230 while the layer 1 is scheduled as the virtual layer of the UE 230.

Figure 4A:
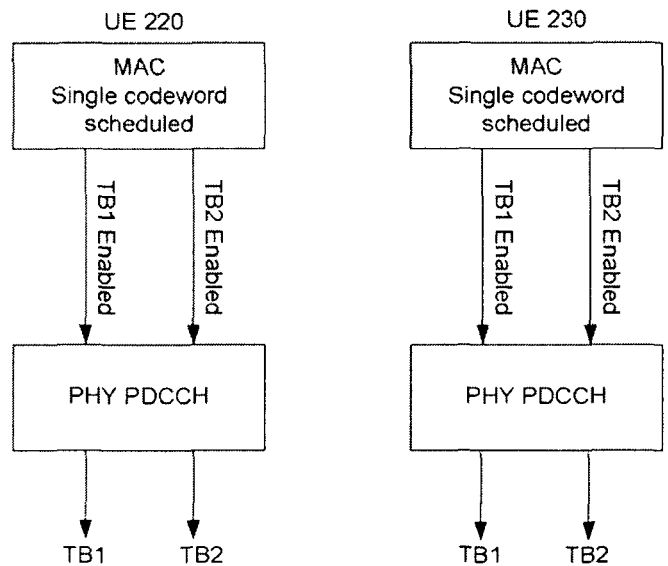
FIG. 4a illustrates a schematic view of DL MU-MIMO scheduling on the control channel in accordance with an embodiment.

During the scheduling, the BS 210 may allocate time-frequency resources for the scheduled layers including the real layer(s) and the virtual layer(s). In an embodiment, the BS 210 will allocate PRB resources and modulation coding scheme (MCS) according to the UE 220's channel quality for the real layer of the UE 220 (i.e. layer 1) as that in conventional single-layer MU-MIMO, and meanwhile in order to enable the virtual layer of the UE 220 (i.e. layer 2), the BS 210 shall also set DL assignment information of corresponding transport blocks (TBs) in the Downlink Control Channel Information (DCI). Finally, the DCI will be transmitted through PDCCH to the UE 220. As a result, the UE 220 will assume both TB1 and TB2 enabled as illustrated in FIG. 4a. Generally, a TB may include one or more layers. For purpose of simplicity, in this example, TB 1 only includes the layer 1 and TB2 only includes the layer 2. In other words, in the UE 220, TB1 represents the real layer while TB2 represents the virtual layer, but in UE 230, TB1 represents the virtual layer while TB2 represents the real layer.

It should be understood that, in case of the presence of multiple available virtual layers, the virtual layers for a UE can be selected as desired. For example, provided that there are three UEs paired together, namely UE A, UE B and UE C, layer 1 is scheduled to UE A as its real layer, layer 2 is scheduled to UE B as its real layer, and layer 3 is scheduled to UE C as it real layer. As for UE A, the BS may schedule both layer 2 and layer 3 to the UE A as its virtual layers. Alternatively, the BS may only schedule layer 2 or layer 3 to the UE A as its virtual layer.

In addition, it should be appreciated that one or more layers can be scheduled to a UE as its real layers. For example, in an embodiment, in case there are three layers and two UEs, UE A and UE B, are paired together, layer 1 and layer 2 can be scheduled to UE A as its real layers, and layer 3 can be scheduled to UE B as its real layer, meanwhile, layer 3 is also scheduled to UE A as its virtual layer.

Also, it should be appreciated that neither the real layer nor the virtual layer is required to be dedicatedly scheduled to one UE. In other words, it is not necessary that all the time-frequency resources on a single layer will be scheduled to one UE. Two or more UEs may share the same layer, while being assigned different parts of the time-frequency resources on this layer.

In block 330, the BS 210 performs DL transmission to the UE (e.g. the UE 220) and the one or more other UEs (e.g. the UE 230) on a transport channel, e.g. Physical Downlink Shared Channel (PDSCH). As for the UE (e.g. 220), only the at least one real layer scheduled to itself is used for DL transmission to the UE, and each of the at least one virtual layer scheduled to the UE is used for DL transmission to at least one of the one or more other UEs.

Figure 4B:
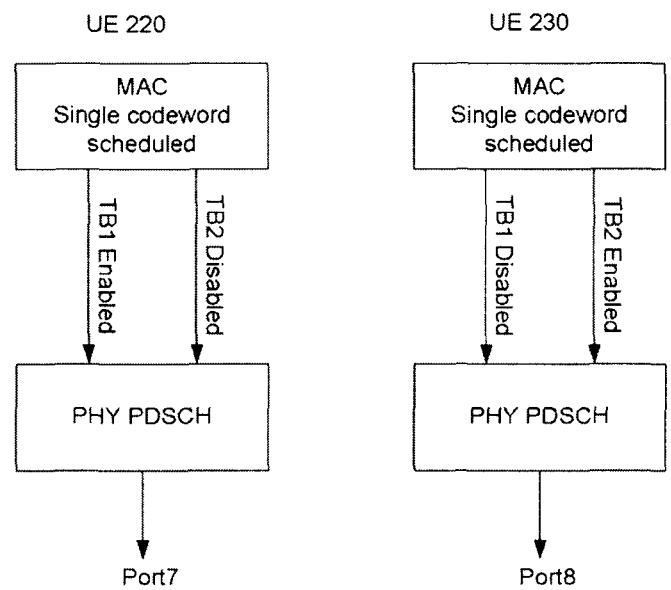
FIG. 4b illustrates a schematic view of DL MU-MIMO transmission on the transport channel in accordance with an embodiment.

For example, in a scenario shown in FIG. 2, the UE 220 is scheduled with the layer 1 as its real layer and the layer 2 as its virtual layer, while the UE 230 is scheduled with the layer 2 as its real layer and the layer 1 as its virtual layer. In this case, the BS 210 will only enable the real layer of each UE for the DL transmission in a transport channel to the corresponding UE. In particular, only the layer 1 is used for the transmission to UE 220 by PDSCH, while only the layer 2 is used for transmission to the UE 230. The virtual layer granted on PDCCH is not really used for transmission for the corresponding UE on PDSCH. As illustrated in FIG. 4*b*, for UE 220, the TB2 corresponding to the layer 2 (the virtual layer of UE 220) is disabled, while for UE 230, the TB1 corresponding to the layer 1 (the virtual layer of UE 230) is disabled.

As a UE of the paired UEs is scheduled with both the real layer(s) used for DL transmission by itself and the virtual layer(s) actually used for such DL transmission by other paired UEs, the UE is implicitly triggered to perform joint detection among all the scheduled layers including both the real layer(s) and virtual layer(s), and meanwhile may be provided with supplementary information that may be used in the joint detection such as scrambling identity for reference signal, precoding matrix, number of layers, and the like. Thus, the interference from virtual layers (i.e. the inter-layer interference from other paired UEs) can be mitigated or even removed by the UE in a non-blind manner. With the mitigation/removal of the inter-layer interference among the paired UE in the DL MU-MIMO transmission, the performance gain of MU-MIMO over SU-MIMO can be readily obtained by further exploiting the spatial separation and diversity. At the same time, due to the implementation of the embodiments, some disadvantages caused by the conventional solutions can be obviated, such as the problem of computation complexity for null space processing.

As described above, the virtual layer(s) scheduled to a UE (e.g. UE 220) won't be used to transmit the payload data of this UE, instead such virtual layers are used to transmit the payload data of other UE(s) (e.g. UE 230) paired with this UE, since the virtual layers of this UE are also scheduled to the other UE(s) as real layer(s). However, the UE 220 itself has no idea of the distinction between the real layer and the virtual layer scheduled to it, hence the UE 220 assumes that all the layers scheduled to it (including both the real layers and the virtual layers) will be used to transmit the payload data for it. In other words, the UE 220 takes all the scheduled layers as its real layers. In this case, during the DL MU-MIMO transmission, the UE 220 will attempt to demodulate the data transmitted on both the real layer(s) and the virtual layer(s). As expected, it can demodulate the data on the real layer(s) successfully, but fails on the virtual layer(s). Because of the failures on the virtual layers, the UE 220 will report a hybrid automatic repeat request (HARQ) negative acknowledgement (NACK) to the BS 210. According to an embodiment, after receiving such HARQ NACK feedback from the UE 220, the BS 210 may simply ignore it. In this way, the whole DL transmission process can operate as usual in spite of the extra virtual layer scheduling.

Furthermore, it should be appreciated that the embodiments may be applicable to various networks with different antenna configurations such as 2Tx, 4Tx and 8Tx and transmission modes such as TM3, TM4, TM8 and TM9.

If the codebook based precoding is required by a transmission mode (e.g. TM4) of the network, the BS (e.g. BS 210) may firstly determine a codebook for the UE (e.g. UE 220) based on the number of layers scheduled for the UE and codebooks used in individual scheduled layers. The codebook for each of the real layers is used by the UE, and the codebook for each of the virtual layers is used by at least one of the one or more other UEs (e.g. UE 230). Then the BS 210 may inform the UE 220 of the codebook.

For example, as shown in FIG. 2, the layer 1 is scheduled to the UE 220 as the real layer and scheduled to the UE 230 as the virtual layer, while the layer 2 is scheduled to the UE 230 as the real layer and scheduled to the UE 220 as the virtual layer. Generally, each layer will use a respective codebook in the DL transmission. Since only a single layer (layer 1) is used to perform the DL transmission to the UE 220, hence the BS 210 may assign the codebook $$\frac{1}{\sqrt{2}}\begin{bmatrix}1\\1\end{bmatrix}$$

to be used on its real layer (layer 1) for the DL transmission, likewise the BS 210 may also assign the code book $$\frac{1}{\sqrt{2}}\begin{bmatrix}1\\-1\end{bmatrix}$$

to be used on the UE 230's real layer (layer 2) for the DL transmission. Taking the UE 220 as example, normally, if the UE 220 is not scheduled with the virtual layer, the BS 210 can merely inform the UE 220 of the codebook $$\frac{1}{\sqrt{2}}\begin{bmatrix}1\\1\end{bmatrix}$$

used by the UE 220. However, now the UE 220 is scheduled two layers, one real layer (layer 1) and one virtual layer (layer 2). As known, the joint detection between the two scheduled layers involves the codebook (also referred to as precoding matrix) used on each layer. In order to ensure the effective joint detection at the UE 220 side, the BS 210 will find a codebook that combines the codebooks used on all the layers scheduled to the UE 220, i.e. the layer 1 and the layer 2, hence the BS 210 may locate the codebook $$\frac{1}{2}\begin{bmatrix}1 & 1\\1 & -1\end{bmatrix}$$

as shown in the below table. Finally, the BS 210 informs the UE 220 of the codebook $$\frac{1}{2}\begin{bmatrix}1 & 1\\1 & -1\end{bmatrix}$$

instead of $$\frac{1}{\sqrt{2}}\begin{bmatrix}1\\1\end{bmatrix}.$$

| Codebook index | Number of layers | |
| --- | --- | --- |
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |

As observed in the field test, in TM4, the gain and channel quality on layer 1 and layer 2 are usually imbalanced, which results in throughput degradation. Now, by implementing the embodiments above, the imbalance can be exploited. For instance, for UE 220, the gain on layer 1 is much higher than that on layer 2. While, for UE 230, the gain on layer 2 is much higher than that on layer 1. As a result, the gain from layer imbalance can be exploited.

Figure 5A:
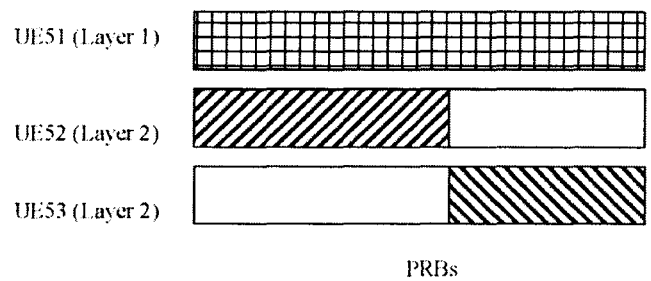
FIG. 5a schematically illustrates the paired UEs allocated with the PRBs that are fully overlapped on each layer in accordance with an embodiment.

Alternatively, in a transmission mode (e.g. TM4) where DL channel estimation is based on common reference signal (CRS), physical resource block allocations on all the layers scheduled for the UE are fully overlapped with each other. For example, in TM4, the DL channel estimation is performed with the use of CRS and precoding matrix. It allows two or more UEs using the same precoding matrix to be paired together. In other words, the two or more UEs may share the same layer, while being assigned different parts of the PRB resources on this layer. In this case, the combined PRB allocations on each layer shall be strictly overlapped. As illustrated in FIG. 5*a*, the UE 51 occupies the PRB resources allocated on the layer 1, while the UE 52 and the UE 53 occupy different parts of the PRB resources allocated on the layer 2. But the whole PRB resources allocated on the layer 1 fully overlaps with the whole PRB resources allocated on the layer 2. That is, the PRB resources occupied by the UE 51 should be fully overlapped with the PRB resources occupied by the UE 52 plus those occupied by the UE 53.

Figure 5B:
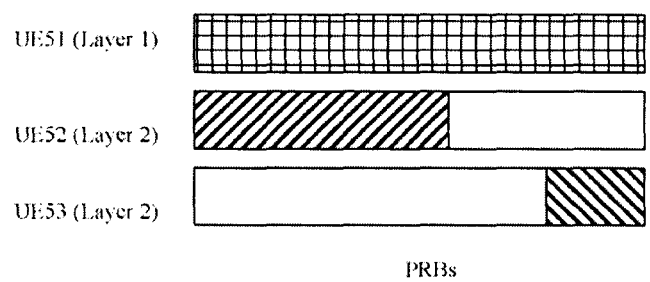
FIG. 5b schematically illustrates the paired UEs allocated with the PRBs that are partially overlapped in accordance with an embodiment.

Also, note that in a transmission mode (e.g. TM8 and TM9) where DL channel estimation is based on UE-specific reference signal such as the demodulation reference signal (DMRS), the strict PRB overlapping as in TM4 may not be necessary. It's because that, in this case, the sequence of reference signal is independent on the scheduled PRB length. The reference signal on each PRB can be calculated by the UE according to the PRB position. The channel estimation can be done in granularity of one PRB. Thus, multiple UEs can be paired together with partial PRB overlapping as shown in FIG. 5*b*. Such UE pairing is especially useful in case that the paired UEs have no equal amount of traffic in buffer to transmit.

Alternatively, in a transmission mode (e.g. TM8 and TM9) where DL channel estimation is based on UE-specific reference signal such as DMRS, a same scrambling identity is allocated to all the paired UEs. For example, In TM8 of Rel-9 and TM9 of Rel-10, the UE-specific reference signal sequence is generated according to cell ID and scrambling identity ($n_{SCID}$).

As mentioned, the UE needs to perform the channel estimation for the virtual layer, if any, which involves the UE-specific reference signal sequence, and thus the UE needs to know the $n_{SCID}$ to calculate the UE-specific reference signal sequence. As known, the UE will use a same $n_{SCID}$ to perform calculation for all the layers scheduled to it, including the real layer(s) and the virtual layer(s). In order for the UE-specific reference signal sequence for a specific layer to be calculated consistently among all the paired UEs, it is desirable that the BS 210 allocates the same $n_{SCID}$ for all paired UEs, since the virtual layer of one UE has to be the real layer of another UE.

Moreover, when the embodiments are implemented in the radio communication network employing the long-term evolution time division duplex (LTE-TDD) mechanism, a possible collision between transmission of HARQ feedback for scheduled layers and transmission of a physical service request (SR) from the UE needs to be taken into account. Specifically, in LTE-TDD system, when ACK/NACK reported in the Physical Uplink Control Channel (PUCCH) is collided with the positive SR, the spatial bundling will be applied at UE side. Taking the UE 220 as example, when the collision happens in the UE 220, the ACK feedback for the real layer (layer 1) will be bundled with the NACK feedback for the virtual layer (layer 2), i.e. ACK & NACK, the resulting feedback is NACK. As can be seen, the ACK feedback for the real layer is missing, which affects the HARQ feedback of the real layer. Such impact can be handled in the following ways:

a) If the collision between transmission of HARQ feedbacks for the scheduled layers and transmission of the SR has happened, and it consequently triggers the spatial bundling at UE side, then after receiving such bundled HARQ feedback, the BS may directly map the HARQ feedback into ACK or NACK as appropriate.

b) Since the BS is responsible for assigning the time slot within which the UE is allowed to transmit the SR, the BS can determine that the collision can occur within this time slot. Hence, during this time slot, the BS may disable the scheduling of virtual layer to the UE. Alternatively, the BS may disable the DL MU-MIMO transmission within this time slot. For example, the BS may fall back to DL SU-MIMO transmission.

Furthermore, it is advantageous that the idea of the present technology is applied in a combined cell. In particular, the paired UEs are located within a combined cell but in different cell areas of the combined cell, and use a transmission mode where DL channel estimation is based on CRS.

Figure 6:
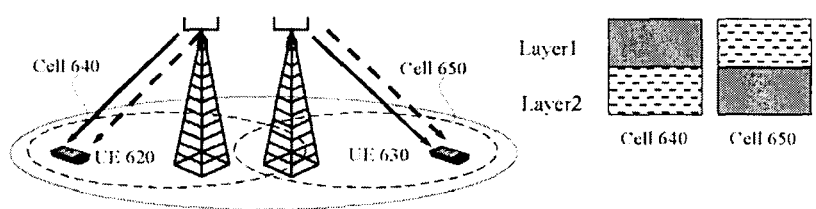
FIG. 6 illustrates a schematic view of a combined cell where it is suitable to implement an embodiment.

For example, as shown in FIG. 6, two cells, cell 640 and cell 650, are combined as a combined cell. Originally, the UE 620 is covered by the cell 640 and the DL transmission is performed on layer 1, while the UE 630 is covered by the cell 650 and the DL transmission is performed on layer 2. After combination, the UE 620 and the UE 630 are within the same cell but in different cell areas, wherein one cell area (hereinafter referred to as cell area 1) is the area originally covered by cell 640 and the other cell area (hereinafter referred to as cell area 2) is the area originally covered by cell 650. In the combined cell, the UE 620 and the UE 630 may be paired for DL MU-MIMO transmission, and the UE 620 is scheduled with the layer 1 (i.e. the real layer of the UE 620) in DL transmission, while the UE 630 is scheduled with the layer 2 (i.e. the real layer of the UE 630) in the DL transmission. As such, the DL inter-layer interference is inevitable between the UE 620 and the UE 630. Hence, it will be desirable that the layer 2 is scheduled to the UE 620 as its virtual layer and/or the layer 1 is scheduled to the UE 630 as its virtual layer. As described above, the virtual layer scheduling may facilitate the removal/mitigation of the DL inter-layer interferences.

In this scenario, the DL channel estimation is performed base on CRS. Conventionally, the CRS for each layer is broadcasted in all the areas of the combined cell including the cell area 1 and the cell area 2. However, now the layer 1 is only used in the cell area 1 for DL transmission, while the layer 2 is only used in the cell area 2 for DL transmission. The transmission of CRS for the layer 1 to the cell area 2 may impact the channel estimation performed by the UE(s) in the cell area 2, and likewise, the transmission of CRS for the layer 2 to cell area 1 may impact the channel estimation performed by the UE(s) in the cell area 1. Hence, in order to facilitate accurate channel estimation that is involved in the joint detection, the CRS may only be transmitted to the cell area where the corresponding layer is really used for DL transmission to the UE(s) there. That is, CRS for the at least one real layer of a UE is only transmitted to the cell area where the UE is located. For example, the CRS for the layer 1 is only transmitted to the cell area 1, while the CRS for the layer 2 is only transmitted to the cell area 2.

It should be understood that the embodiments may also be applicable to the combined cell where the channel estimation is based on DMRS, in which case such separate transmission of CRS as in the above described CRS-based combined cell is not necessary.

Figure 7:
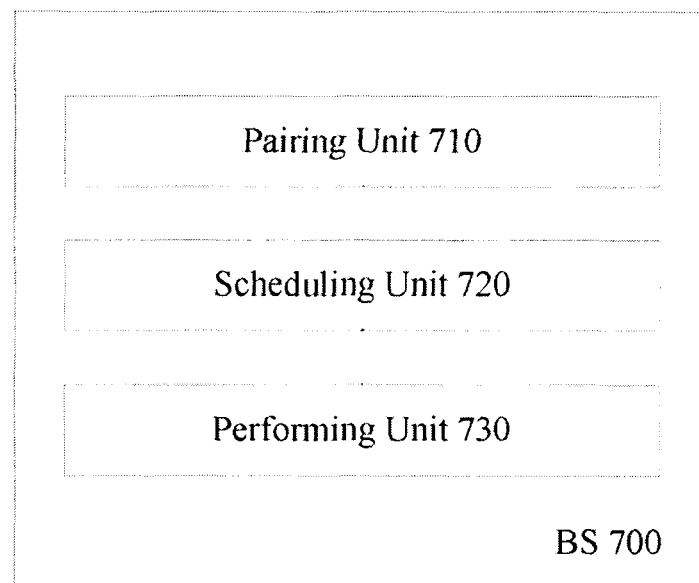
FIG. 7 schematically illustrates a block diagram of a base station configured to perform DL MI-MIMO transmission in accordance with an embodiment.

FIG. 7 is a block diagram of an exemplifying base station configured to perform the DL MI-MIMO transmission in accordance with an embodiment. As illustrated in FIG. 7, the base station 700 may comprise a pairing unit 710, a scheduling unit 720 and a performing unit 730. It should be appreciated that the base station is not limited to the shown elements, and can comprise other conventional elements and additional elements for other purposes. Now the functions of the individual units will be described in detail with reference to the FIG. 2 and FIG. 7. Here the BS 700 in FIG. 7 is taken as the BS 210 in the FIG. 2.

The pairing unit 710 of the BS 700 is configured to pair a UE (e.g. UE 220) with one ore more other UEs (e.g. UE 230) for DL MU-MIMO transmission in a radio communication network, e.g. network 200. The DL transmission refers to the data transmission from the BS to the UE(s). Herein, the term "paired UEs" will be used to represent two or more UEs sharing the same time-frequency resources, for example at different layers in space, in a DL MU-MIMO transmission. For example, the paired UEs may include UE 220 and UE 230. Here, it should be appreciated that more than one UE can be paired with a UE (e.g. UE 220 or UE 230) for the DL MU-MIMO transmission.

Specifically, the pairing unit 710 may pair the UEs having a predetermined spatial distance from each other. However, it should be appreciated that the pairing unit 710 may determine which UEs will be paired together for a DL MU-MIMO transmission depending on other known criteria.

The scheduling unit 720 of the BS 700 is configured to schedule at least one real layer and at least one virtual layer to the UE (e.g. UE 220) through a control channel, e.g. the Physical Downlink Control Channel (PDCCH), and each of the at least one virtual layer is a real layer scheduled for at least one of the one or more other UEs (e.g. UE 230 in the scenario of FIG. 2). Here, a real layer is defined as a layer that is scheduled through the control channel to a UE and used to perform DL transmission on the transport channel for the UE, while a virtual layers is defined as a layer that is scheduled through the control channel to a UE but without performing DL transmission on transport channel for the UE. Indeed, in this embodiment, the virtual layer is used to perform the DL transmission to other UE(s) whose real layer is such a virtual layer. As indicated, only part of layers scheduled to the UE will undertake the DL transmission to such UE.

For example, the scheduling unit 720 may schedule through the PDCCH the layer 1 and the layer 2 to the UE 220. The layer 1 is scheduled as the real layer of the UE 220 and the layer 2 is scheduled as the virtual layer of the UE 220. Meanwhile, the scheduling unit 720 schedules the layer 2 to the UE 230. The layer 2 is scheduled as the real layer of the UE 230. Alternatively, the scheduling unit 720 may also schedule both the layer 1 and the layer 2 to the UE 230. In this case, the layer 2 still is the real layer of the UE 230 while the layer 1 is scheduled as the virtual layer of the UE 230.

During the scheduling, the scheduling unit 720 may allocate time-frequency resources for the scheduled layers including the real layer(s) and the virtual layer(s). In an embodiment, the scheduling unit 720 will allocate PRB resources and MCS according to the UE 220's channel quality for the real layer of the UE 220 (i.e. layer 1) as that in conventional single-layer MU-MIMO, and meanwhile in order to enable the virtual layer of the UE 220 (i.e. layer 2), the scheduling unit 720 shall also set DL assignment information of corresponding transport blocks (TBs) in the DCI. Finally, the DCI will be transmitted through PDCCH to the UE 220. As a result, the UE 220 will assume both TB1 and TB2 enabled as illustrated in FIG. 4a. Generally, a TB may include one or more layers. For purpose of simplicity, in this example, TB1 only includes the layer 1 and TB2 only includes the layer 2. In other words, in the UE 220, TB1 represents the real layer while TB2 represents the virtual layer, but in UE 230, TB1 represents the virtual layer while TB2 represents the real layer.

It should be understood that, in case of the presence of multiple available virtual layers, the virtual layers for a UE can be selected as desired. For example, provided that there are three UEs paired together, namely UE A, UE B and UE C, layer 1 is scheduled to UE A as its real layer, layer 2 is scheduled to UE B as its real layer, and layer 3 is scheduled to UE C as it real layer. As for UE A, the scheduling unit 720 may schedule both layer 2 and layer 3 to the UE A as its virtual layers. Alternatively, the scheduling unit 720 may only schedule layer 2 or layer 3 to the UE A as its virtual layer.

In addition, it should be appreciated that one or more layers can be scheduled to a UE as its real layers. For example, in an embodiment, in case there are three layers and two UEs UE A and UE B, are paired together, layer 1 and layer 2 can be scheduled to UE A as its real layers, and layer 3 can be scheduled to UE B as its real layer, meanwhile, layer 3 is also scheduled to UE A as its virtual layer.

Also, it should be appreciated that neither the real layer nor the virtual layer is required to be dedicatedly scheduled to one UE. In other words, it is not necessary that all the time-frequency resources on a single layer will be scheduled to one UE. Two or more UEs may share the same layer, while being assigned different parts of the time-frequency resources on this layer.

The performing unit 730 of the BS 700 is configured to perform DL transmission to the UE (e.g. UE 220) and the one or more other UEs (e.g. UE 230) on a transport channel, e.g. Physical Downlink Shared Channel (PDSCH). As for the UE (e.g. UE 220), only the at least one real layer scheduled to itself is used for DL transmission to the UE, and each of the at least one virtual layer scheduled to the UE is used for DL transmission to at least one of the one or more other UEs.

For example, in a scenario shown in FIG. 2, the UE 220 is scheduled with the layer 1 as its real layer and the layer 2 as its virtual layer, while the UE 230 is scheduled with the layer 2 as its real layer and the layer 1 as its virtual layer. In this case, the performing unit 730 will only enable the real layer of each UE for the DL transmission in a transport channel to the corresponding UE. In particular, only the layer 1 is used for the DL transmission to UE 220 by PDSCH, while only the layer 2 is used for the transmission to the UE 230. The virtual layer granted on PDCCH is not really used for transmission for the corresponding UE on PDSCH. As illustrated in FIG. 4b, for UE 220, the TB2 corresponding to the layer 2 (the virtual layer of UE 220) is disabled, while for UE 230, the TB1 corresponding to the layer 1 (the virtual layer of UE 230) is disabled.

As a UE of the paired UEs is scheduled with both the real layer(s) used for DL transmission by itself and the virtual layer(s) actually used for such DL transmission by other paired UEs, the UE is implicitly triggered to perform joint detection among all the scheduled layers including both the real layer(s) and virtual layer(s), and meanwhile may be provided with supplementary information that may be used in the joint detection such as scrambling identity for reference signal, precoding matrix, number of layers, and the like. Thus, the interference from virtual layers (i.e. the inter-layer interference from other paired UEs) can be mitigated or even removed by the UE in a non-blind manner. With the mitigation/removal of the inter-layer interference among the paired UE in the DL MU-MIMO transmission, the performance gain of MU-MIMO over SU-MIMO can be readily obtained by further exploiting the spatial separation and diversity. At the same time, due to the implementation of the embodiments, some disadvantages caused by the conventional solutions can be obviated, such as the problem of computation complexity for null space processing.

As described above, the virtual layer(s) scheduled to a UE (e.g. UE 220) won't be used to transmit the payload data of this UE, instead such virtual layers are used to transmit the payload data of other UE(s) (e.g. UE 230) paired with this UE, since the virtual layer(s) of this UE are also scheduled to the other UE(s) as real layer(s). However, the UE 220 itself has no idea of the distinction between the real layer and the virtual layer scheduled to it, hence the UE 220 assumes that all the layers scheduled to it (including both the real layers and the virtual layers) will be used to transmit the payload data for it. In other words, the UE 220 takes all the scheduled layers as its real layers. In this case, during the DL MU-MIMO transmission, the UE 220 will attempt to demodulate the data transmitted on both the real layer(s) and the virtual layer(s). As expected, it can demodulate the data on the real layer(s) successfully, but fails on the virtual layer(s). Because of the failures on the virtual layer(s), the UE 220 will report a hybrid automatic repeat request (HARQ) negative acknowledgement (NACK) to the BS 700. According to an embodiment, after receiving such HARQ NACK feedback from the UE 220, the BS 700 may simply ignore it. In this way, the whole DL transmission process can operate as usual in spite of the extra virtual layer scheduling.

Furthermore, it should be appreciated that the embodiments may be applicable to various networks with different antenna configurations such as 2Tx, 4Tx and 8Tx and transmission mode such as TM3, TM4, TM8 and TM9.

If the codebook based precoding is required by a transmission mode (e.g. TM4) of the network, the scheduling unit 720 may be further configured to firstly determine a codebook for the UE (e.g. UE 220) based on the number of layers scheduled for the UE and codebooks used in individual scheduled layers. The codebook for each of the real layers is used by the UE, and the codebook for each of the virtual layers is used by at least one of the one or more UEs (e.g. UE 230). Then the scheduling unit 720 may inform the UE 220 of the codebook.

For example, as shown in FIG. 2, the layer 1 is scheduled to the UE 220 as the real layer and scheduled to the UE 230 as the virtual layer, while the layer 2 is scheduled to the UE 230 as the real layer and scheduled to the UE 220 as the virtual layer. Generally, each layer will use a respective codebook in the DL transmission. Since only a single layer (layer 1) is used to perform the DL transmission to the UE 220, hence the BS 700 (in particular the scheduling unit 720) may assign the codebook $$\frac{1}{\sqrt{2}}\begin{bmatrix} 1 \\ 1 \end{bmatrix}$$

to be used on its real layer (layer 1) for the DL transmission, likewise the BS 700 may also assign the code book $$\frac{1}{\sqrt{2}}\begin{bmatrix} 1 \\ -1 \end{bmatrix}$$

to be used on the UE 230's real layer (layer 2) for the DL transmission. Taking the UE 220 as example, normally, if the UE 220 is not scheduled with the virtual layer, the BS 700 can merely inform the UE 220 of the codebook $$\frac{1}{\sqrt{2}}\begin{bmatrix} 1 \\ 1 \end{bmatrix}$$

used by the UE 220. However, now the UE 220 is scheduled two layers, one real layer (layer 1) and one virtual layer (layer 2). As known, the joint detection between the two scheduled layers involves the codebook (also referred to as precoding matrix) used on each layer. In order to ensure the effective joint detection at the UE 220 side, the BS 700 will find a codebook that combines the codebooks used on all the layers scheduled to the UE 220, i.e. the layer 1 and the layer 2, hence the BS 700 may locate the codebook $$\frac{1}{2}\begin{bmatrix} 1 & 1 \\ 1 & -1 \end{bmatrix}$$

as shown in the below table. Finally, the BS 700 informs the UE 220 of the codebook $$\frac{1}{2}\begin{bmatrix} 1 & 1 \\ 1 & -1 \end{bmatrix}$$

instead of $$\frac{1}{\sqrt{2}}\begin{bmatrix} 1 \\ 1 \end{bmatrix}.$$

| Codebook index | Number of layers | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |

As observed in the field test, in TM4, the gain and channel quality on layer 1 and layer 2 are usually imbalanced, which results in throughput degradation. Now, by implementing the embodiments above, the imbalance can be exploited. For instance, for UE 220, the gain on layer 1 is much higher than that on layer 2. While, for UE 230, the gain on layer 2 is much higher than that on layer 1. As a result, the gain from layer imbalance can be exploited.

Alternatively, in a transmission mode (e.g. TM4) where DL channel estimation is based on common reference signal (CRS), physical resource block allocations on all the layers scheduled for the UE are fully overlapped with each other. For example, in TM4, the DL channel estimation is performed with the use of CRS and precoding matrix. It allows two or more UEs using the same precoding matrix to be paired together. In other words, the two or more UEs may share the same layer, while being assigned different parts of the PRB resources on this layer. In this case, the combined PRB allocations on each layer shall be strictly overlapped. As illustrated in FIG. 5a, the UE 51 occupies the PRB resources allocated on the layer 1, while the UE 52 and the UE 53 occupy different parts of the PRB resources allocated on the layer 2. But the whole PRB resources allocated on the layer 1 fully overlaps with the whole PRB resources allocated on the layer 2. That is, the PRB resources occupied by the UE 51 should be fully overlapped with the PRB resources occupied by the UE 52 plus those occupied by the UE 53.

Also, note that in a transmission mode (e.g. TM8 and TM9) where DL channel estimation is based on UE-specific reference signal such as the demodulation reference signal (DMRS), the strict PRB overlapping as in TM4 may not be necessary. It's because that, in this case, the sequence of reference signal is independent of the scheduled PRB length. The reference signal on each PRB can be calculated by the UE according to the PRB position. The channel estimation can be done in granularity of one PRB. Thus, multiple UEs can be paired together with partial PRB overlapping as shown in FIG. 5b. Such UE pairing is especially useful in case that the paired UEs have no equal amount of traffic in buffer to transmit. Alternatively, in a transmission mode (e.g. TM8 and TM9) where DL channel estimation is based on UE-specific reference signal such as DMRS, a same scrambling identity is allocated to all the paired UEs. For example, In TM8 of Rel-9 and TM9 of Rel-10, the UE-specific reference signal sequence is generated according to cell ID and scrambling identity ($n_{SCID}$).

As mentioned, the UE needs to perform the channel estimation for the virtual layer, if any, which involves the UE-specific reference signal sequence, and thus the UE needs to know the $n_{SCID}$ to calculate the UE-specific reference signal sequence. As known, the UE will use a same $n_{SCID}$ to perform calculation for all the layers scheduled to it, including the real layer(s) and the virtual layer(s). In order for the UE-specific reference signal sequence for a specific layer to be calculated consistently among all the paired UEs, it is desirable that the BS 700 allocates the same $n_{SCID}$ for all paired UEs since the virtual layer of one UE has to be the real layer of another UE.

Moreover, when the embodiments are implemented in the radio communication network employing the long-term evolution time division duplex (LTE-TDD) mechanism, a possible collision between transmission of HARQ feedback for scheduled layers and transmission of a physical service request (SR) from the UE needs to be taken into account. Specifically, in LTE-TDD system, when ACK/NACK reported in the Physical Uplink Control Channel (PUCCH) is collided with the positive SR, the spatial bundling will be applied at UE side. Taking the UE 220 as example, when the collision happens in the UE 220, the ACK feedback for the real layer (layer 1) will be bundled with the NACK feedback for the virtual layer (layer 2), i.e. ACK & NACK, the resulting feedback is NACK. As can be seen, the ACK feedback for the real layer is missing, which affects the HARQ feedback of the real layer. Such impact can be handled in the following ways:

a) If the collision between transmission of HARQ feedbacks for the scheduled layers and transmission of the SR has happened, and it consequently triggers the spatial bundling at UE side, then after receiving such bundled HARQ feedback, the BS 700 may directly map the HARQ feedback into ACK or NACK as appropriate.

b) Since the BS 700 is responsible for assigning the time slot within which the UE is allowed to transmit the SR, the BS can determine that the collision can only occur within this time slot. Hence, during this time slot, the BS 700 may disable the scheduling of virtual layer to the UE. Alternatively, the BS may disable the DL MU-MIMO transmission within this time slot. For example, the BS may fall back to DL SU-MIMO transmission.

Furthermore, it is advantageous that the idea of the present technology is applied in a combined cell. In particular, the paired UEs are located within a combined cell but in different cell areas of the combined cell, and use a transmission mode where DL channel estimation is based on CRS.

For example, as shown in FIG. 6, two cells, cell 640 and cell 650, are combined as a combined cell. Originally, the UE 620 is covered by the cell 640 and the DL transmission is performed on layer 1, while the UE 630 is covered by the cell 650 and the DL transmission is performed on layer 2. After combination, the UE 620 and the UE 630 are within the same cell but in different cell areas, wherein one cell area (hereinafter referred to as cell area 1) is the area originally covered by cell 640 and the other cell area (hereinafter referred to as cell area 2) is the area originally covered by cell 650. In the combined cell, the UE 620 and the UE 630 may be paired for DL MU-MIMO transmission, and the UE 620 is scheduled with the layer 1 (i.e. the real layer of the UE 620) in DL transmission, while the UE 630 is scheduled with the layer 2 (i.e. the real layer of the UE 630) in the DL transmission. As such, the DL inter-layer interference is inevitable between the UE 620 and the UE 630. Hence, it will be desirable that the layer 2 is scheduled to the UE 620 as its virtual layer and/or the layer 1 is scheduled to the UE 630 as its virtual layer. As described above, the virtual layer scheduling may facilitate the removal/mitigation of the DL inter-layer interferences.

In this scenario, the DL channel estimation is performed base on CRS. Conventionally, the CRS for each layer is broadcasted in all the areas of the combined cell including the cell area 1 and the cell area 2. However, now the layer 1 is only used in the cell area 1 for DL transmission, while the layer 2 is only used in the cell area 2 for DL transmission. The transmission of CRS for the layer 1 to the cell area 2 may impact the channel estimation performed by the UE(s) in the cell area 2, and likewise, the transmission of CRS for the layer 2 to cell area 1 may impact the channel estimation performed by the UE(s) in the cell area 1. Hence, in order to facilitate accurate channel estimation that is involved in the joint detection, the CRS may only be transmitted to the cell area where the corresponding layer is really used for DL transmission to the UE(s) there. That is, the BS may be configured to only transmit CRS for the at least one real layer of a UE to the cell area where the UE is located. For example, the CRS for the layer 1 is only transmitted to the cell area 1, while the CRS for the layer 2 is only transmitted to the cell area 2.

It should be understood that the embodiments may also be applicable to the combined cell where the channel estimation is based on DMRS, in which case such separate transmission as in CRS-based combined cell is not necessary.

While the embodiments have been illustrated and described herein, it will be understood by those skilled in the art that various changes and modifications may be made, any equivalents may be substituted for elements thereof without departing from the true scope of the present technology. In addition, many modifications may be made to adapt to a particular situation and the teaching herein without departing from its central scope. Therefore it is intended that the present embodiments not be limited to the particular embodiment disclosed as the best mode contemplated for carrying out the present technology, but that the present embodiments include all embodiments falling within the scope of the appended claims.

The invention claimed is:

1. A downlink, DL, transmission method in a base station of a radio communication network enabling multi-user multiple-input multiple-output, MU-MIMO, comprising:
    pairing a user equipment, UE, with one or more other UEs for DL MU-MIMO transmission in the radio communication network;
    scheduling through a control channel at least one real layer and at least one virtual layer to the UE such that the UE is triggered to perform joint detection among the at least one real layer and the at least one virtual layer, wherein each of the at least one virtual layer is a real layer scheduled for at least one of the one or more other UEs; and
    performing DL transmission to the UE and the one or more other UEs on a transport channel, wherein only the at least one real layer is used for DL transmission to the UE, and each of the at least one virtual layer is used for DL transmission to at least one of the one or more other UEs.

2. The method of claim 1, wherein if codebook based precoding is required by a transmission mode of the radio communication network, the scheduling comprises determining a codebook for the UE based on a number of layers scheduled for the UE and codebooks used in individual scheduled layers, wherein the codebook for each of the at least one real layer is used by the UE, and the codebook for each of the at least one virtual layer is used by at least one of the one or more other UEs, and informing the UE of the codebook.

3. The method of claim 1, wherein in a transmission mode where DL channel estimation is based on a common reference signal, CRS, physical resource block allocations on all the layers scheduled for the UE are fully overlapped with each other, and in a transmission mode where DL channel estimation is based on a UE-specific reference signal, the physical resource block allocations on all the layers scheduled for the UE are allowed to be partially overlapped with each other.

4. The method of the claim 1, wherein when the radio communication network employs a long-term evolution time division duplex, LTE-TDD, mechanism, the method further comprises:
    if transmission of hybrid automatic repeat request, HARQ, feedback for the scheduled layers is collided with transmission of a physical service request, SR, mapping the HARQ feedback into acknowledgement, ACK, or negative acknowledgement, NACK; or
    if in a time slot, it is determined that a potential collision between transmission of the HARQ feedback for layers to be scheduled and transmission of a SR will occur, disabling the scheduling of the at least one virtual layer to the UE in this time slot, or disabling DL MU-MIMO transmission in this time slot.

5. The method of claim 1, wherein in a transmission mode where DL channel estimation is based on a UE-specific reference signal, a same scrambling identity is allocated to the UE and the one or more other UEs.

6. The method of claim 1, wherein if the UE and the one or more other UEs are located within a combined cell but in different cell areas of the combined cell, and use a transmission mode where DL channel estimation is based on a CRS, the method further comprises only transmitting the CRS for the at least one real layer to a cell area where the UE is located.

7. The method of claim 1, further comprising, when receiving a hybrid automatic repeat request negative acknowledgement, HARQ NACK, feedback for the at least one virtual layer of the UE, ignoring the HARQ NACK feedback.

8. The method of claim 1, wherein the radio communication network is a Time-Division Duplex Long-Term Evolution, TDD-LTE, network or a Frequency-Division Duplex Long-Term Evolution, FDD-LTE, network.

9. A base station configured to perform downlink, DL, transmission in a radio communication network enabling multi-user multiple-input multiple-output, MU-MIMO, comprising:
    a pairing unit adapted to pair a user equipment, UE, with one or more other UEs for DL MU-MIMO transmission in the radio communication network;
    a scheduling unit adapted to schedule through a control channel at least one real layer and at least one virtual layer to the UE such that the UE is triggered to perform joint detection among the at least one real layer and the at least one virtual layer, wherein each of the at least one virtual layer is a real layer scheduled for at least one of the one or more other UEs; and
    a performing unit adapted to perform DL transmission to the UE and the one or more other UEs on a transport channel, wherein only the at least one real layer is used for DL transmission to the UE, and each of the at least one virtual layer is used for DL transmission to at least one of the one or more other UEs.

10. The base station of claim 9, wherein if codebook based precoding is required by a transmission mode of the radio communication network, the scheduling unit is adapted to determine a codebook for the UE based on a number of layers scheduled for the UE and codebooks used in individual scheduled layers, wherein the codebook for each of the at least one real layer is used by the UE, and the codebook for each of the at least one virtual layer is used by at least one of the one or more other UEs, and inform the UE of the codebook.

11. The base station of claim 9, wherein in a transmission mode where DL channel estimation is based on a common reference signal, CRS, physical resource block allocations on all the layers scheduled for the UE are fully overlapped with each other, and in a transmission mode where DL channel estimation is based on a UE-specific reference signal, the physical resource block allocations on all the layers scheduled for the UE are allowed to be partially overlapped with each other.

12. The base station of claim 9, wherein when the radio communication network employs a long-term evolution time division duplex, LTE-TDD, mechanism:
   if transmission of hybrid automatic repeat request, HARQ, feedback for the scheduled layers is collided with transmission of a physical service request, SR, the base station is adapted to map the HARQ feedback into acknowledgement, ACK, or negative acknowledgement, NACK; or
   if in a time slot, it is determined that a potential collision between transmission of the HARQ feedback for layers to be scheduled and transmission of a SR will occur, the base station is adapted to disable the scheduling of the at least one virtual layer to the UE in this time slot, or disabling DL MU-MIMO transmission in this time slot.

13. The base station of claim 9, wherein in a transmission mode where DL channel estimation is based on a UE-specific reference signal, a same scrambling identity is allocated to the UE and the one or more other UEs.

14. The base station of claim 9, wherein if the UE and the one or more other UEs are located within a combined cell but in different cell areas of the combined cell, and use a transmission mode where DL channel estimation is based on a CRS, the base station is adapted to only transmit the CRS for the at least one real layer to a cell area where the UE is located.

15. The base station of claim 9, wherein when receiving a hybrid automatic repeat request negative acknowledgement, HARQ NACK, feedback for the at least one virtual layer of the UE, the base station is adapted to ignore the HARQ NACK feedback.

16. An apparatus for performing downlink, DL, transmission in a radio communication network enabling multi-user multiple-input multiple-output, MU-MIMO, comprising a processor and a memory, said memory containing instructions executable by said processor whereby said apparatus is operative to:
   pair a user equipment, UE, with one or more other UEs for DL MU-MIMO transmission in the radio communication network;
   schedule through a control channel at least one real layer and at least one virtual layer to the UE such that the UE is triggered to perform joint detection among the at least one real layer and the at least one virtual layer, wherein each of the at least one virtual layer is a real layer scheduled for at least one of the one or more other UEs; and
   perform DL transmission to the UE and the one or more other UEs on a transport channel, wherein only the at least one real layer is used for DL transmission to the UE, and each of the at least one virtual layer is used for DL transmission to at least one of the one or more other UEs.

* * * * *